(12) United States Patent
Phelps et al.

(10) Patent No.: US 7,536,899 B1
(45) Date of Patent: May 26, 2009

(54) FLANGE PENETRATOR PRESSURE TEST FIXTURE

(75) Inventors: Peter T. Phelps, Middletown, RI (US); Earl S. Nickerson, Little Compton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 356 days.

(21) Appl. No.: 11/527,665

(22) Filed: Sep. 22, 2006

(51) Int. Cl.
*G01M 3/08* (2006.01)
(52) U.S. Cl. ........................................................ 73/46
(58) Field of Classification Search .................. 73/46, 73/49.1–49.8
See application file for complete search history.

(56) References Cited

U.S. PATENT DOCUMENTS

| | | | | |
|---|---|---|---|---|
| 2,934,942 A | * | 5/1960 | Carrie | 73/46 |
| 4,377,185 A | * | 3/1983 | Katz | 138/90 |
| 4,520,655 A | | 6/1985 | Owens | |
| 5,448,907 A | * | 9/1995 | Jensen et al. | 73/38 |
| 5,880,358 A | | 3/1999 | Emmitte, Jr. | |

FOREIGN PATENT DOCUMENTS

| | | | |
|---|---|---|---|
| JP | 01262433 A | * | 10/1989 |
| JP | 2000074777 A | * | 3/2000 |

* cited by examiner

*Primary Examiner*—Hezron Williams
*Assistant Examiner*—Gunnar J Gissel
(74) *Attorney, Agent, or Firm*—James M. Kasischke; Michael P. Stanley; Jean-Paul A. Nasser

(57) ABSTRACT

An apparatus as a fixture for fluidly pressure testing a flange penetrator seal with the apparatus having a flange cover including a recess and a flange extension including a recess with the extension matable to the cover such that the recesses create a volume around the seal. The extension is secured to the flange of a device for which the flange penetrator seal supports. The cover has a pressure fitting for application of fluid pressure to the recess of the cover for pressure testing the seal within the volume and the extension having a fitting for draining the volume after testing is complete. The test fixture includes a clamping fixture attachable to the cover, the clamping fixture encompassing the flange cover and the extension such that the apparatus can be further secured to the flange of the device which the flange penetrator seal supports.

11 Claims, 10 Drawing Sheets

FLANGE PENETRATOR PRESSURE TEST FIXTURE

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates to an apparatus as a fixture for pressure testing of a flange penetrator seal.

(2) Description of the Prior Art

It is known in the art, that flange penetrator seals are used to segmentize components of watertight or pressure-tight containers such as missile tubes. Specifically, a blind flange segmentizes the container and the penetrator provides a conduit through the flange. The conduit is typically used to connect electrical power or data input to any devices within the segmented components. The seal maintains the water or pressure-tight characteristics of the conduit.

Present testing devices for flange penetrator seals create a vacuum on the missile tube or device side of the flange. Once the vacuum is created, leakage through the flange penetrator seal is measured. A problem with existing test devices is that devices can only test up to atmospheric pressure and cannot apply hydrostatic pressure on the sea side of the flange penetrator seal.

SUMMARY OF THE INVENTION

It is therefore a general object and primary purpose of the present invention to provide an apparatus that allows hydrostatic pressure testing of a flange penetrator seal.

It is therefore a further purpose of the present invention to provide an apparatus that allows pneumatic pressure testing of a flange penetrator seal.

To attain the objects described, the flange penetrator pressure test fixture of the present invention is primarily designed to mate with the upper flange of the Composite Capsule Launching System (CCLS) and the flange penetrator over the mold of the Electrical Umbilical Cable Assembly for the CCLS; however, the test fixture of the present invention can be adapted to alternate flange penetrator seals by modifications recognized by those ordinarily skilled in the art.

The test fixture generally includes a flange extension and flange cover that are bolted onto each other and the CCLS upper flange to create an enclosed volume around the flange penetrator seal. This allows a hydraulic testing pressure to act on the flange penetrator seal by a pressure/vent port on the test fixture. The test fixture described can pressure test the flange penetrator seal up to 185 psi. A drain outlet allows the test fixture to be drained of water or other testing fluids.

The apparatus also includes a fixture clamp assembly, which is mechanically attachable to the flange cover. The fixture clamp assembly encompasses the flange cover and the flange extension to further secure the test fixture to the CCLS upper flange.

BRIEF DESCRIPTION OF THE DRAWINGS

Thus by the present invention, its objects and advantages will become readily apparent upon reading the following detailed description is conjunction with the accompanying in drawings in which.

DESCRIPTION OF THE PREFERRED EMBODIMENT

Figure 1:
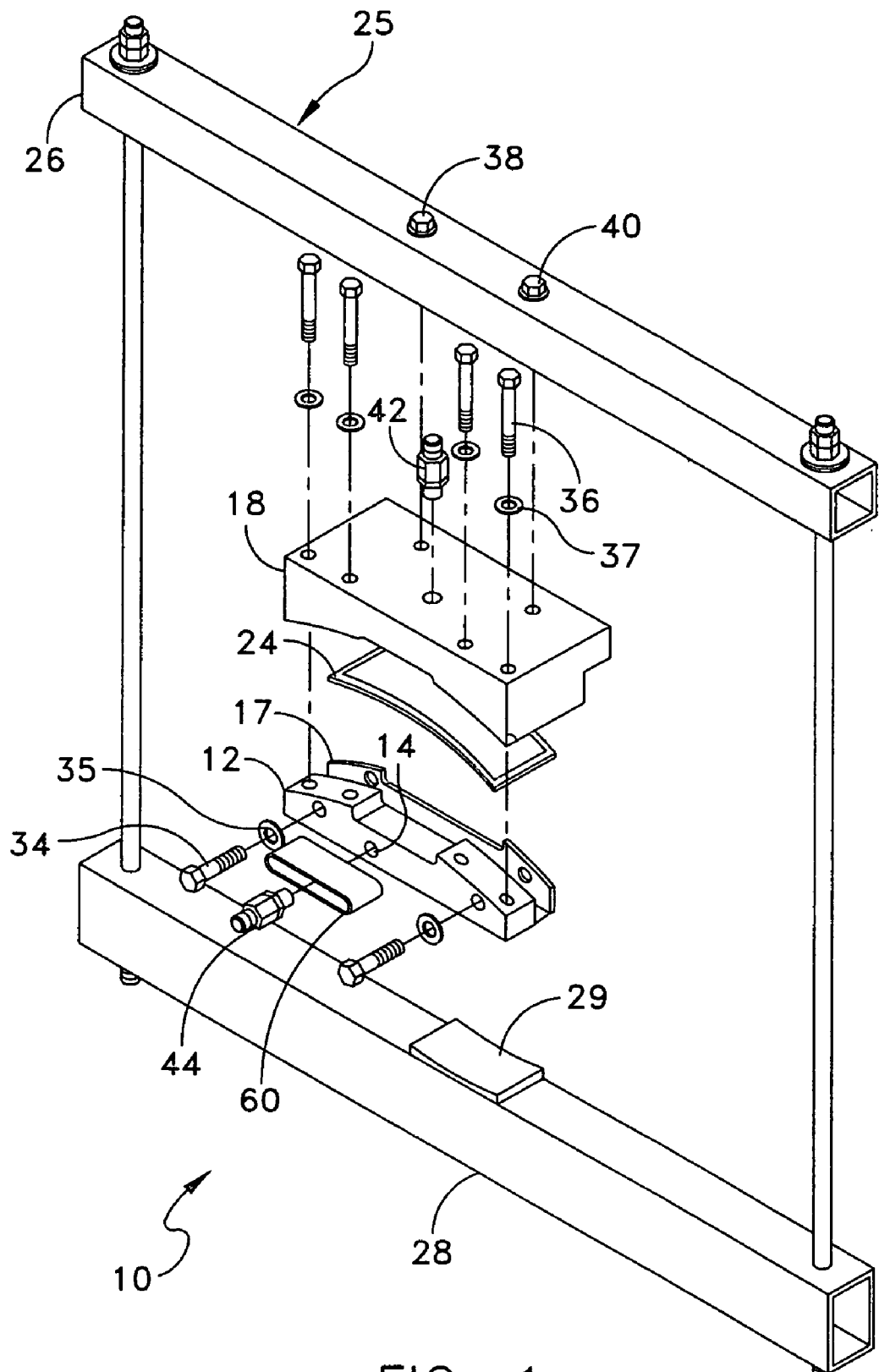
FIG. 1 depicts a perspective view of the pressure test fixture of the present invention.
Figure 2:
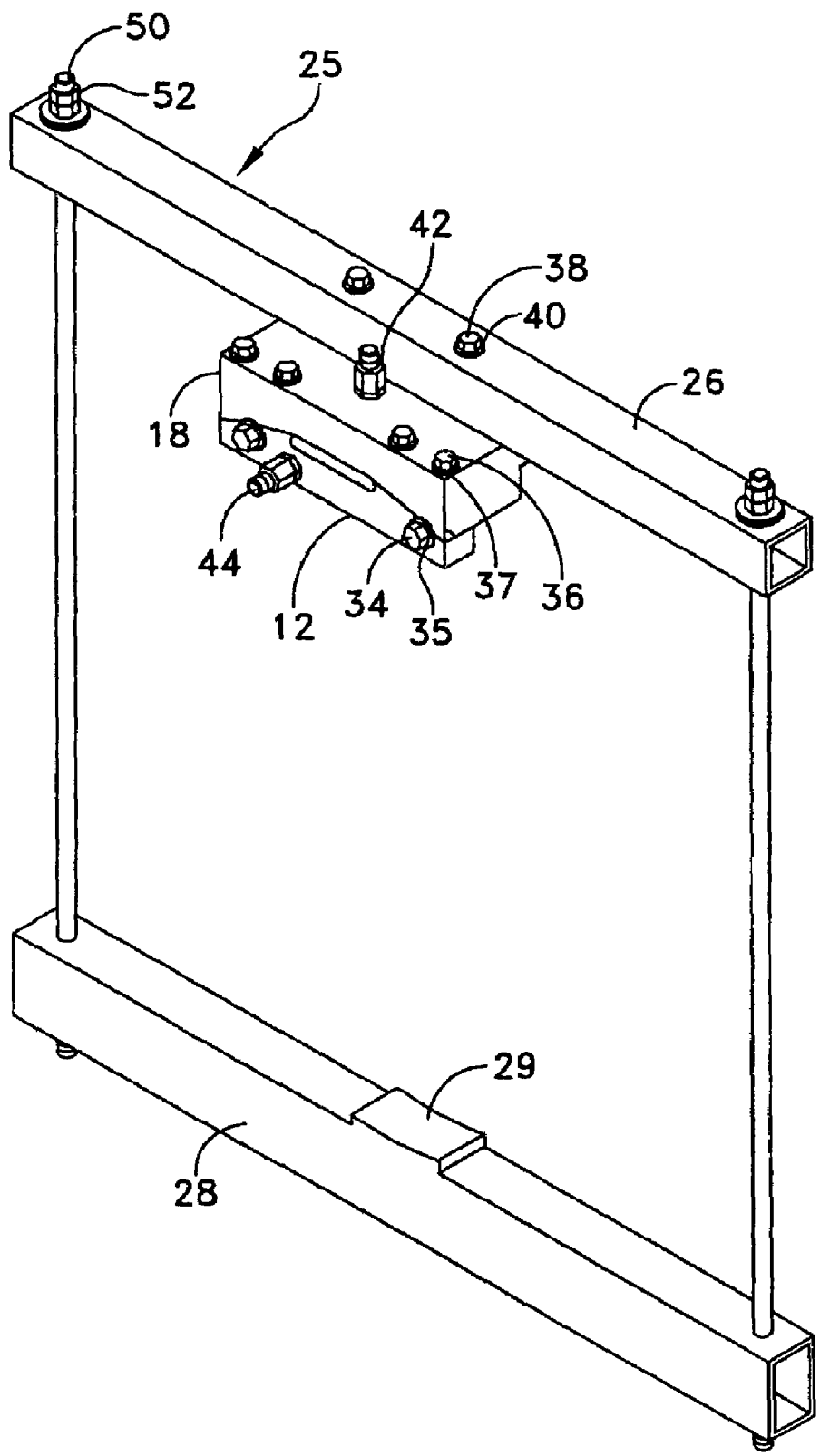
FIG. 2 depicts an assembled view of the pressure test fixture of the present invention.
Figure 3:
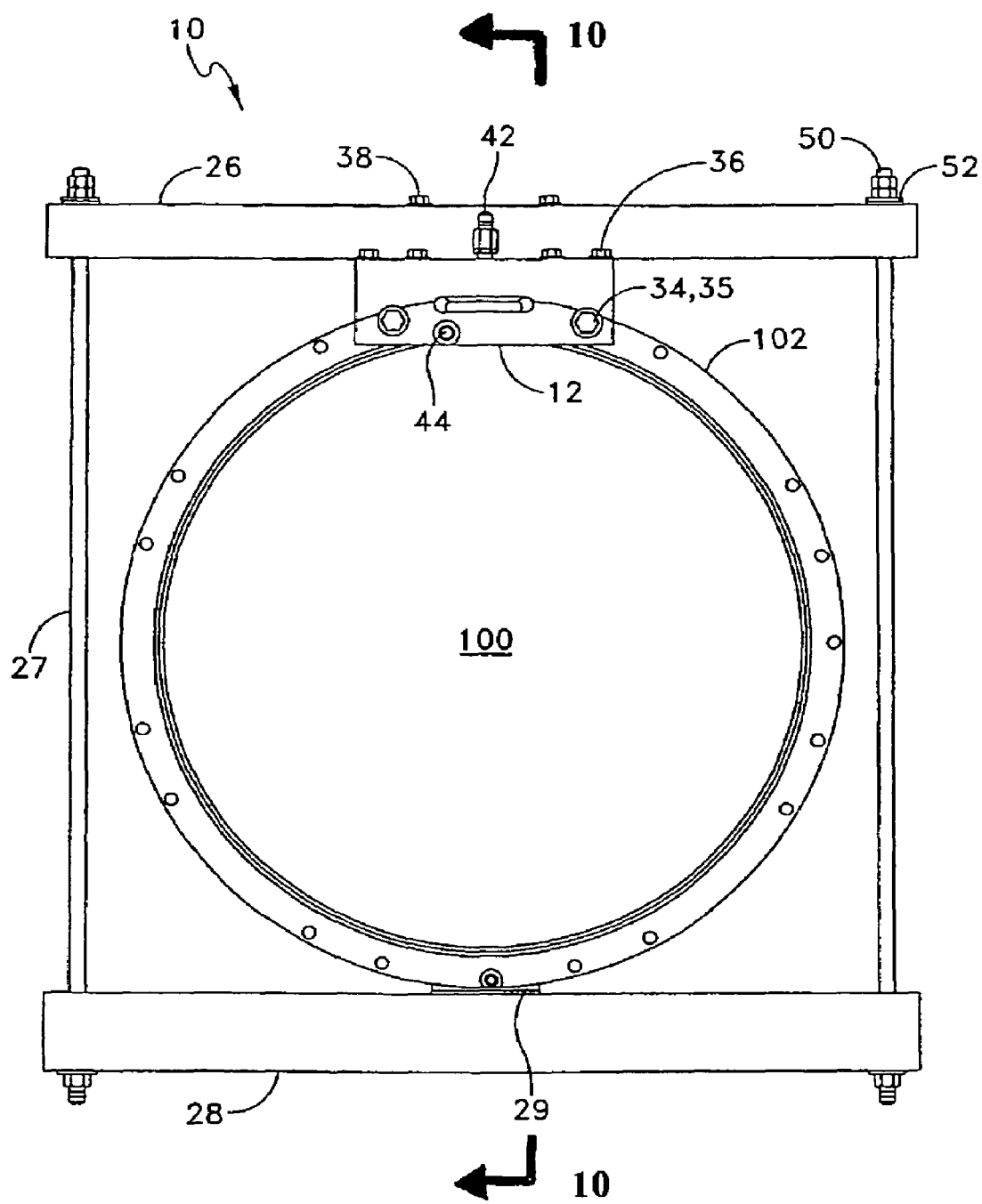
FIG. 3 depicts an alternate assembled view of the pressure test fixture of the present invention with a flange for testing shown.

Referring now to the drawings in detail wherein like numerals indicate like elements throughout the several views, FIG. 1 depicts a disassembled view of the flange penetrator pressure test apparatus 10 (hereinafter referred to as the test fixture) of the present invention. The test fixture 10 generally includes a flange extension 12, flange cover 18 and flange cover gasket 24. During pressure testing, the flange extension 12, a flange extension gasket 17, a strip gasket 60, the flange cover 18 and the flange cover gasket 24 mate to create an enclosed volume resting on an upper flange 102 of the Composite Capsule Launching System (CCLS) 100 (See FIG. 2, FIG. 3, FIG. 4 and FIG. 5). The test fixture 10 also includes a fixture clamp assembly 25, to better secure the flange cover 18 on the CCLS 100.

Figure 5:
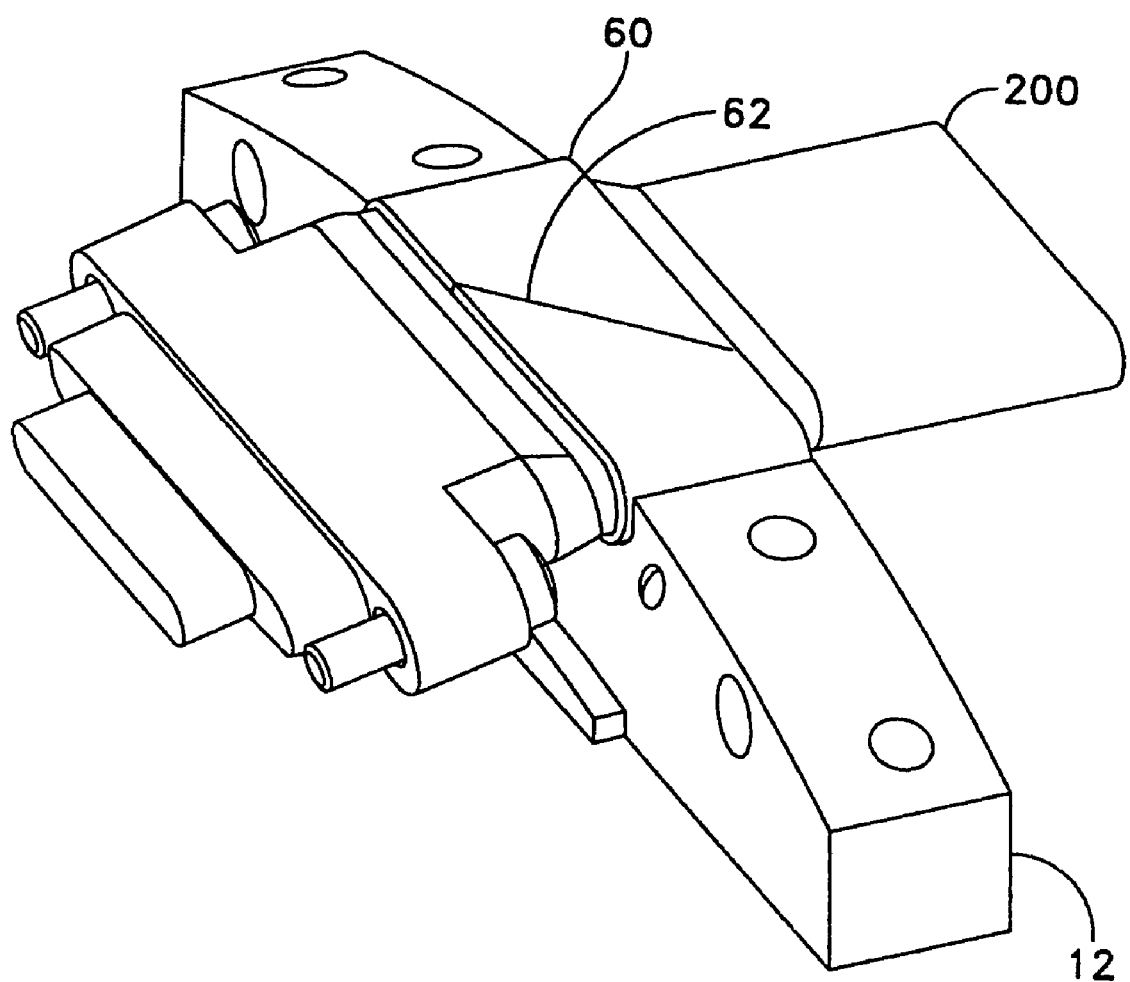
FIG. 5 depicts an assembled view of a flange penetrator seal set in a flange extension of the present invention in order to depict placement of the flange penetrator seal.
Figure 6:
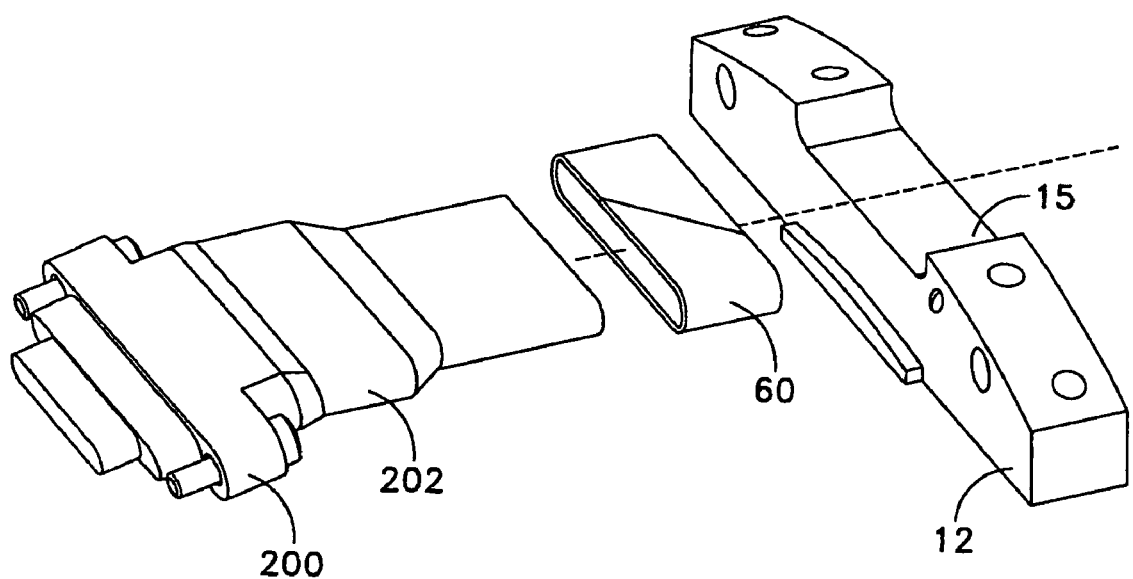
FIG. 6 depicts a disassembled view of a flange penetrator seal apart from the flange extension of the present invention.

Referencing FIG. 5 and FIG. 6, for a pressure testing of a flange penetrator seal 200, the flange extension 12 is bolted onto the upper flange 102 of the CCLS 100 with bolts 34 and washers 35. A flange extension gasket 17 is interposed between the flange extension 12 and the upper flange 102. The strip gasket 60 (mateable at cut line 62) is interposed between a flange penetrator overmold 202 and the flange extension 12.

Figure 7:
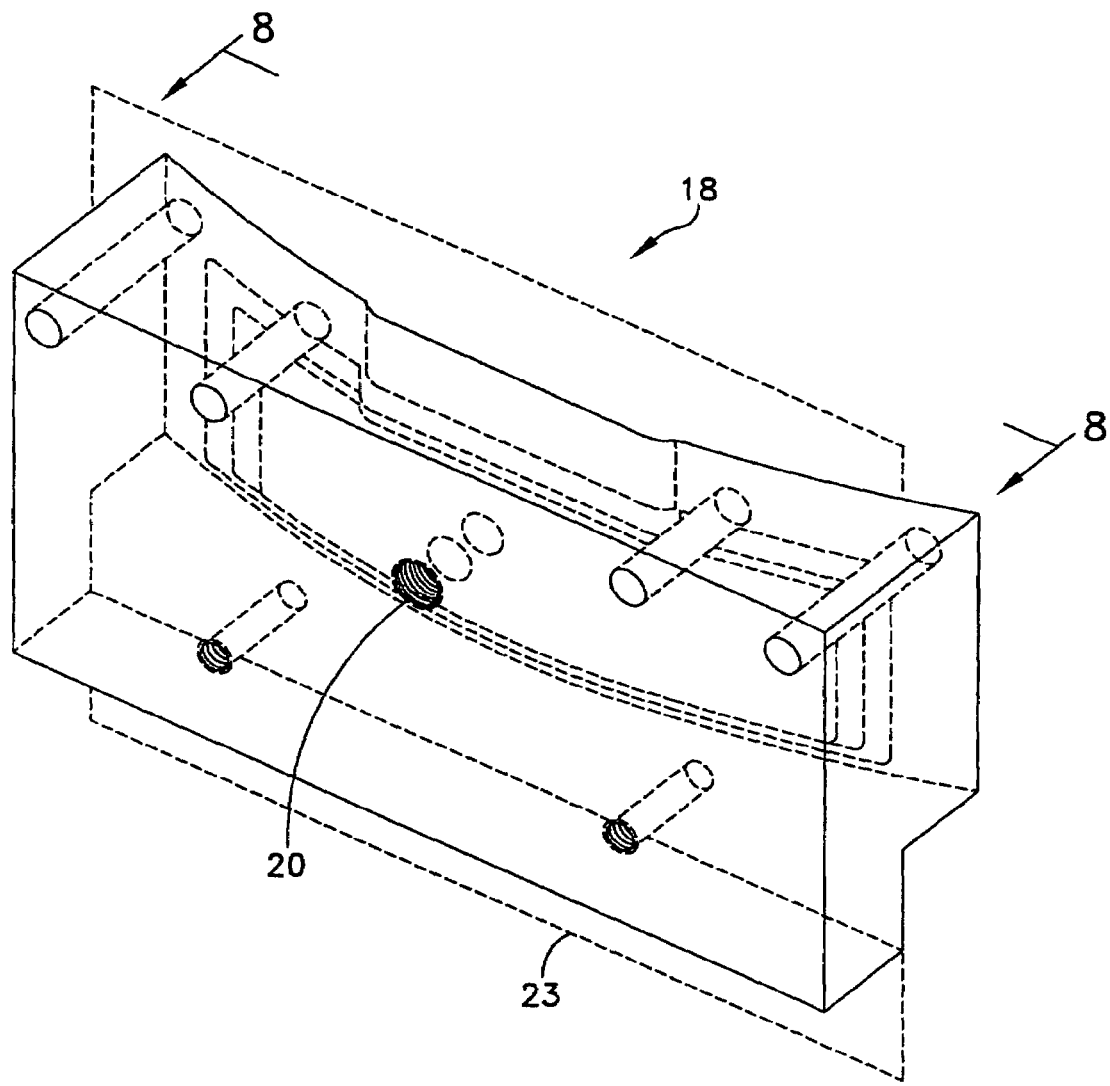
FIG. 7 depicts a flange cover of the pressure test fixture of the present invention.
Figure 8:
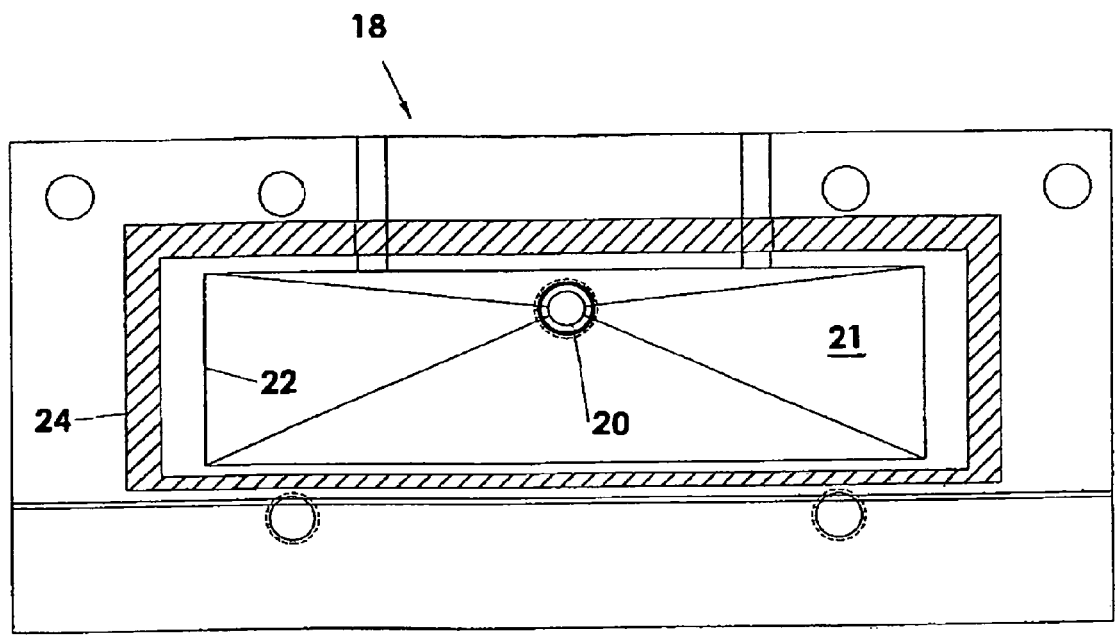
FIG. 8 is an alternate view of the flange cover with the view taken from reference line 8-8 of FIG. 7.

As shown in FIG. 7 and FIG. 8, the flange cover gasket 24 is positioned in a groove 19 of the flange cover 18 to compress as a seal therebetween the flange extension 12, the flange 102 and the flange cover. The use of the flange cover gasket 24 as a seal will be discussed further below.

Figure 4:
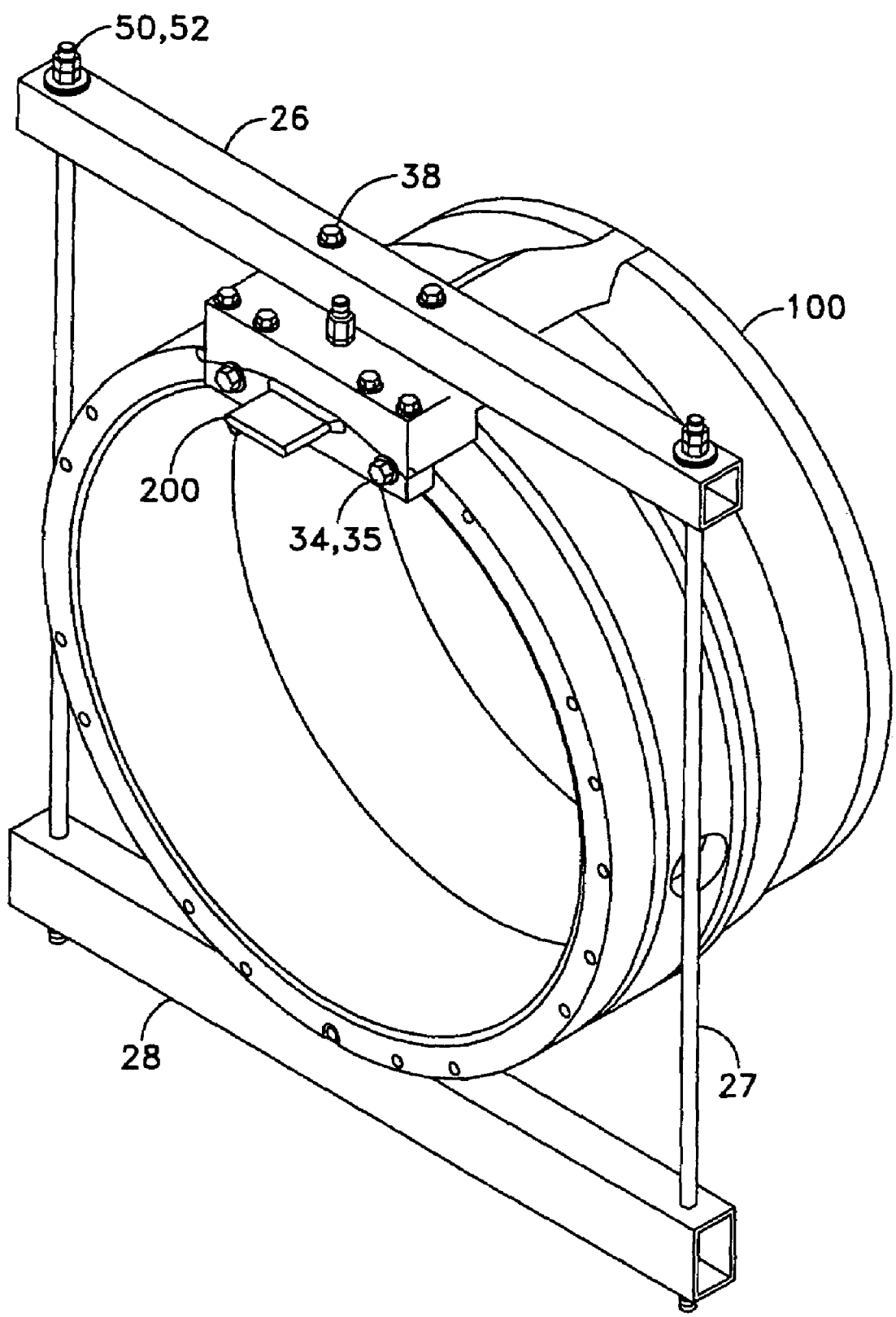
FIG. 4 depicts another alternate assembled view of the pressure test fixture of the present invention with the flange for testing shown.

During further assembly for pressure testing, the flange cover 18 is bolted onto the flange extension 12 with bolts 36 and washers 37 with the flange penetrator overmold 202 interposed between the flange cover 18, the strip gasket 60 and the flange extension 12 (See FIG. 4 and FIG. 5). A clamp upper tube 26 of the fixture clamp assembly 25 bolts onto the flange cover 18 at bolts 38 and washers 40. Although the bolts 34, 36, 38 and washers 35, 37, 40 are shown, alternate fastening means known to these skilled in the art may be employed instead of these bolts and washers as well as for other bolts and washers identified in this specification.

The fixture clamp fixture clamp assembly 25, when bolted to the flange cover 18, acts like a vice around the upper flange 102 (see FIG. 3 and FIG. 4) of the CCLS 100 and the flange cover. The test fixture 10 can then be pressurized at pressure/vent fitting 42 through fluid channel 20 of the flange cover 18. A drain fitting 44 connected to a drain port conduit 14 of the flange extension 12 is provided to drain the test fixture 10—typically once pressure testing is complete.

In addition to the clamp upper tube 26, the fixture clamp assembly 25 includes rods 27 extending to a clamp lower tube 28 with pedestal 29. The rods 27 are secured with nuts 50 and washers 52. The upper flange 102 can rest on the pedestal 29 of the clamp lower tube 28.

Figure 9:
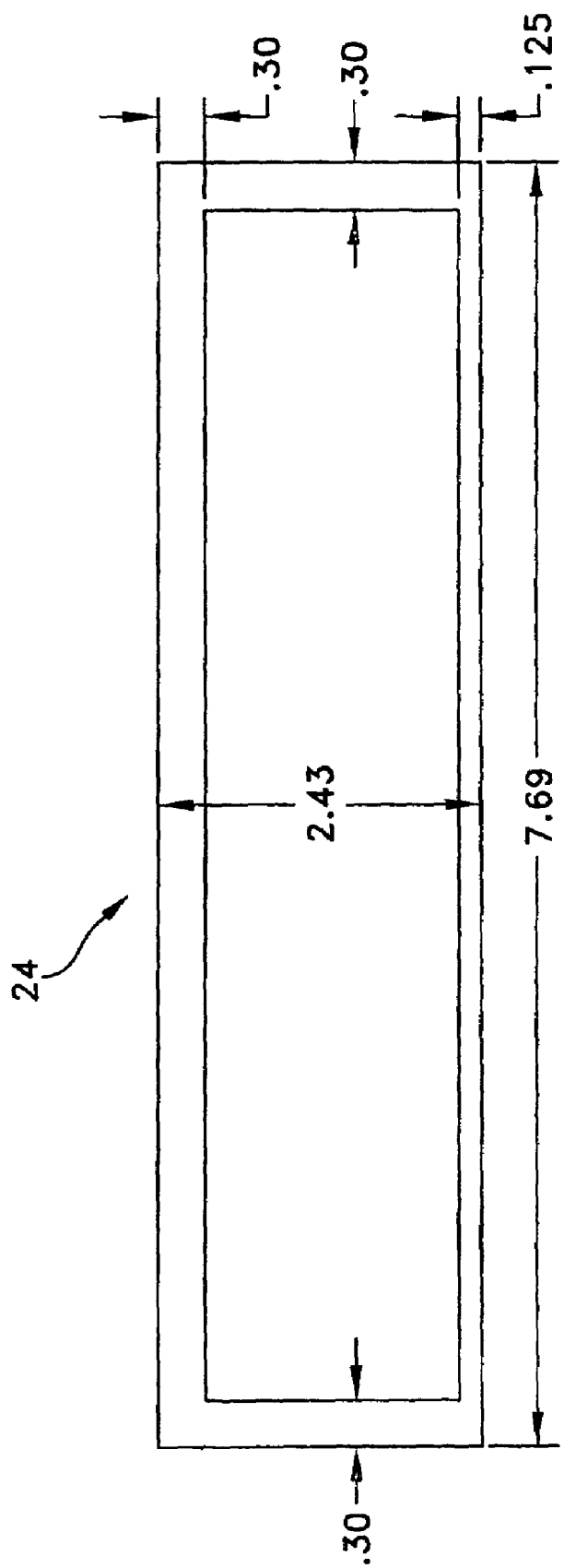
FIG. 9 depicts a flange cover gasket of the pressure test fixture of the present invention.
Figure 10:
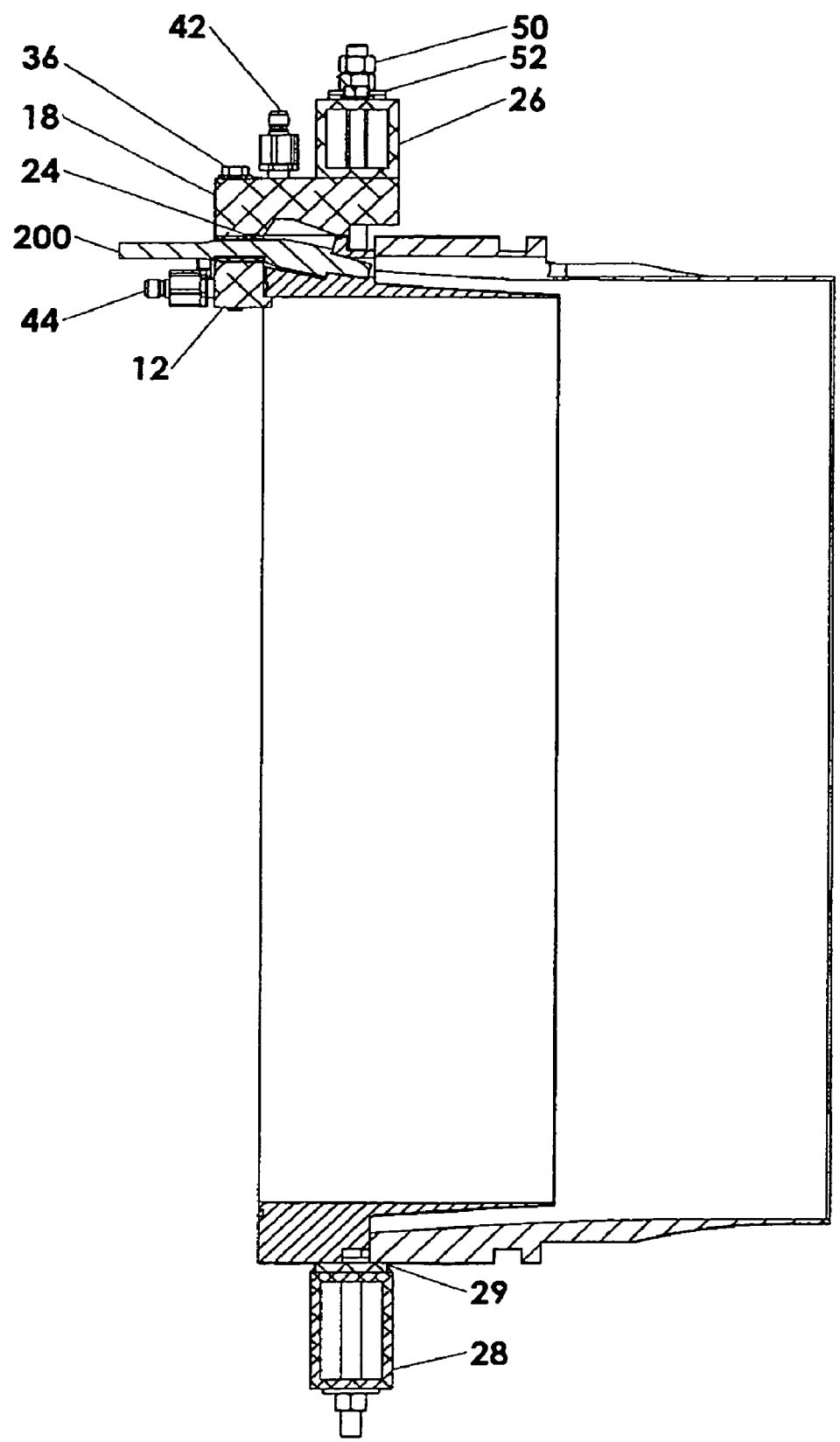
FIG. 10 depicts an alternate assembled view of the pressure test fixture of the present invention with the view taken from reference line 10-10 of FIG. 3.

As shown in FIG. 7 and FIG. 8, the flange cover 18 is particularly designed to accommodate the flange penetrator seal 200 at a recess 21. The recess 21 angles from edges 22 to a central plane 23 of the in order to increase volume from the pressure/vent port 20 and to distribute testing pressure equally throut the recess and onto the flange penetrator seal 200. The groove 19 of the flange cover 18 accommodates the flange cover gasket 24 (preferably 1/12 inch thick flange neoprene rubber) to compress and seal the recess 21 when the flange cover is mated with the flange extension 12 (See FIG. 9 for the dimensioned flange cover gasket). As shown in FIG. 6, the flange extension 12 is also particularly designed to accommodate the strip gasket 60 and the flange penetrator overmold 202 at a recess 15.

In operation, the pressure fitting 42 is fluidly connected to a pressure source (not shown). The assembled pressure test fixture 10 has the flange penetrator overmold 202 and the strip gasket 60 secured in the recess 15 of the flange extension 12 and the recess 21 of the flange cover 18. The recess 21 is pressurized to test pressure thru the pressure fitting 42 and the fluid channel 20. The source of the fluid pressure is closed and the pressure at the flange penetrator seal 200 is observed for a predetermined time for acceptable sealing. Once pressure testing is complete, the test fixture 10 is depressurized thru pressure/vent port 42 and drained thru the drain fitting 44 fluidly connected thru the drain port conduit 14 of the flange extension 12.

The primary advantage of the test fixture 10 is that high pressure can be applied; thereby, simulating the seaside action on the flange penetrator seal 200. The test fixture 10 described can pressure test the flange penetrator seal 200 up to 185 psi. As such, the test fixture 10 can fully test the pressure requirements of the flange penetrator seal 200. The test fixture 10 is also portable; therefore, the pressure test fixture can be broken down and easily transported for other uses.

The foregoing description of the preferred embodiment of the invention has been presented for purposes of illustration and description only. It is neither intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An apparatus for fluid testing a flange penetrator seal, said apparatus comprising:
   a flange cover in which said flange cover has two faces protruding opposite to each other and spaced away from a central plane wherein a first face is a flattened plane and a second face decreases in distance from a first and second end to the central plane with a recess positioned within said second face decreasing in distance to the central plane and a groove within said second face encompassing said recess, said flange cover including a pressure fitting at said first face and fluidly connected to said recess;
   a flange extension mechanically attachable to said second face of said flange cover at a first surface shaped inverse to said second face of said flange cover, said flange extension having a second surface extending at an angle away from said first surface, said flange extension mechanically attachable at said second surface to a flange supported by the flange penetrator seal and said second surface having a fitting fluidly connected to a recess at said first surface of said flange extension wherein a said flange extension is mateable to said flange cover and a flange supported by the flange penetrator seal for creating a volume for sealing the flange penetrator seal;
   a gasket sized to be positioned within said groove such that said gasket is capable of being compressed by said flange extension and said flange cover when both are mated; and
   a strip gasket sized to be positioned within the created volume and sized to encompass the flange penetrator seal;
   wherein said pressure fitting is fluidly connectable to a pressure source such that said apparatus is capable of fluidly testing the flange penetrator seal in the created volume and wherein said fitting of said flange extension is capable of draining said apparatus after the fluid testing.

2. The apparatus according to claim 1, said apparatus further comprising:
   a fixture clamp assembly mechanically attachable to said flange cover, said fixture clamp assembly encompassing said flange cover and said flange extension to compress to said first face of said flange cover such that said fixture clamp assembly is securable to the flange supported by the flange penetrator seal.

3. The apparatus according to claim 2 in which said fixture clamp assembly further comprises:
   a first clamp tube of rectangular configuration as the attachment point of said flange cover;
   a second clamp tube of rectangular configuration, said second clamp tube including a pedestal opposite said first clamp tube for resting the flange supported by the flange penetrator seal; and
   a pair of reinforcing bars extending longitudinally thereof and perpendicular to a plane of said first clamp tube and said second clamp tube to encompass the flange supported by the flange penetrator seal.

4. The apparatus in accordance with claim 3 wherein said recess of said flange cover is rectangular.

5. The apparatus in accordance with claim 4 wherein said gasket is rectangular.

6. The apparatus in accordance with claim 5 wherein said gasket includes an interior rectangular periphery and an exterior rectangular periphery spaced apart from said interior rectangular periphery at a distance of 0.30 inches on one long leg of the rectangular shape of said gasket and two short legs of the rectangular shape of said gasket and at a distance of 0.125 inches on one long leg of the rectangular shape.

7. The apparatus in accordance with claim 6 wherein said groove includes an interior rectangular periphery and a exterior rectangular periphery spaced apart from said interior rectangular periphery at a distance of greater than 0.30 inches on one long leg of the rectangular shape of said groove and two short legs of the rectangular shape of said groove and at a distance of greater than 0.125 inches on one long leg of the rectangular shape of said groove.

8. The apparatus in accordance with claim 1 wherein said recess of said flange cover is rectangular.

9. The apparatus in accordance with claim 8 wherein said gasket is rectangular.

10. The apparatus in accordance with claim 9 wherein said gasket includes an interior rectangular periphery and a exterior rectangular periphery spaced apart from said interior rectangular periphery at a distance of 0.30 inches on one long leg of the rectangular shape of said gasket and two short legs of the rectangular shape of said gasket and at a distance of 0.125 inches on one long leg of the rectangular shape.

11. The apparatus in accordance with claim 10 wherein said groove includes an interior rectangular periphery and a exterior rectangular periphery spaced apart from said interior rectangular periphery at a distance of greater than 0.30 inches on one long leg of the rectangular shape of said groove and two short legs of the rectangular shape of said groove and at a distance greater than 0.125 inches on one long leg of the rectangular shape of said groove.

\* \* \* \* \*